United States Patent
Le et al.

(10) Patent No.: US 10,812,330 B2
(45) Date of Patent: Oct. 20, 2020

(54) NETWORK EQUIPMENT OPERATION ADJUSTMENT SYSTEM

(71) Applicant: T-Mobile USA, Inc., Bellevue, WA (US)

(72) Inventors: Brandon Le, Dublin, CA (US); Andrea Bonanomi, Concord, CA (US); Jason Firth, Las Vegas, NV (US); Todd Vancleve, Walnut Creek, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 87 days.

(21) Appl. No.: 15/853,144

(22) Filed: Dec. 22, 2017

(65) Prior Publication Data
US 2019/0199589 A1    Jun. 27, 2019

(51) Int. Cl.
*G06F 15/177* (2006.01)
*H04L 12/24* (2006.01)
*G06N 20/00* (2019.01)
*H04L 12/26* (2006.01)
*H04W 88/08* (2009.01)
*H04W 84/04* (2009.01)

(52) U.S. Cl.
CPC ......... *H04L 41/0816* (2013.01); *G06N 20/00* (2019.01); *H04L 43/045* (2013.01); *H04L 43/08* (2013.01); *H04L 41/22* (2013.01); *H04W 84/042* (2013.01); *H04W 88/08* (2013.01)

(58) Field of Classification Search
CPC ..... H04L 41/0816; H04L 41/22; G06N 20/00; H04W 84/042; H04W 88/08
See application file for complete search history.

(56) References Cited

U.S. PATENT DOCUMENTS

| 2013/0196685 | A1* | 8/2013 | Griff | H04L 43/067 455/456.1 |
| 2017/0064569 | A1* | 3/2017 | Martone | H04L 43/0852 |
| 2019/0068443 | A1* | 2/2019 | Li | G06N 20/00 |

OTHER PUBLICATIONS

RootMetrics, "A simple premise for a sophisticated methodology," Jan. 20, 2016, https://rootmetrics.com/en-US/methodology, retrieved from https://web.archive.org/ on Apr. 29, 2020.
Net Promoter Network, "What Is Net Promoter?" Dec. 1, 2017, http://www.netpromoter.com/know/, retrieved from https://web.archive.org/ on Apr. 29, 2020.

\* cited by examiner

*Primary Examiner* — Ryan J Jakovac
(74) *Attorney, Agent, or Firm* — Knobbe Martens Olson & Bear LLP

(57) ABSTRACT

A network equipment operation adjustment system is provided herein that is configured to improve the performance of a telecommunications network by generating a network score representing the performance of a telecommunications network within a geographic region, determining one or more network equipment parameter adjustments using the network score, and causing the adjustments to occur. The network equipment operation adjustment system can further display the network score and other network scores for other geographic regions in an interactive user interface to efficiently allow a network operator to view the network performance of a telecommunications network by geographic region and/or to view how the network performance in each of the geographic regions is changing over time.

22 Claims, 13 Drawing Sheets

NETWORK EQUIPMENT OPERATION ADJUSTMENT SYSTEM

BACKGROUND

A core network (also known as network core or backbone network) is the central part of a telecommunications network that provides various services to telecommunication devices, often referred to as user equipment ("UE"), that are connected by access network(s) of the telecommunications network. Typically, a core network includes high capacity communication facilities that connect primary nodes, and provides paths for the exchange of information between different sub-networks.

The core network and/or the access network(s) of the telecommunications network include various network equipment that facilitate communications between UEs. The network equipment are located in various regions and are initially configured to provide optimal network performance given a set of network conditions assumed to be present in the respective regions. However, various factors (e.g., the introduction of additional or different types of UEs, network interference, changing user network usage habits, damage to network equipment, etc.) can contribute to the actual network conditions in a particular region differing from what was expected. Thus, some network equipment may be misconfigured and unable to provide optimal network performance.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
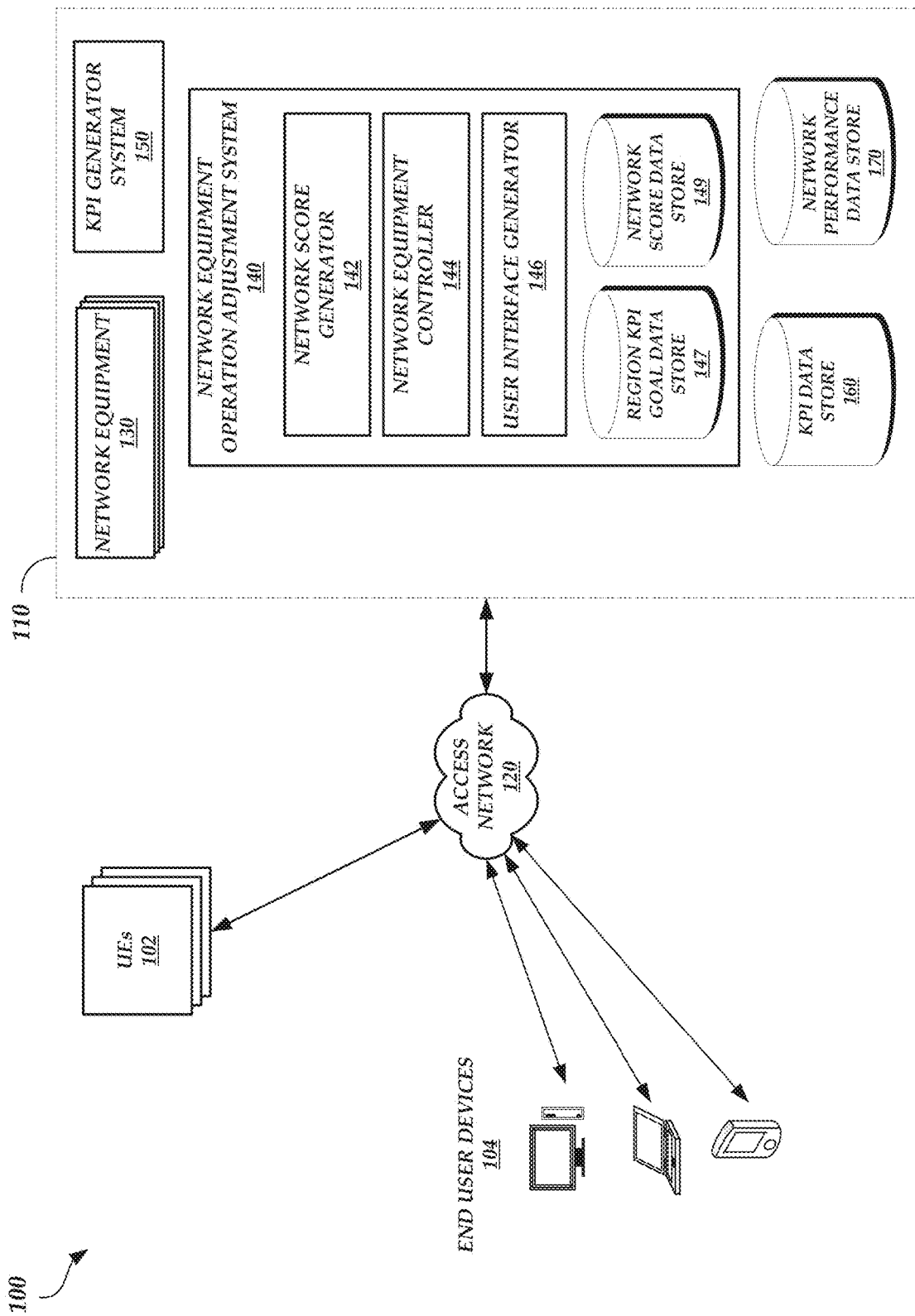
FIG. 1 is a block diagram of an illustrative network equipment operation adjustment environment in which a network equipment operation adjustment system generates one or more network scores, generates user interface data for displaying the network score(s), and uses the network score(s) to control network equipment and/or components in an access network.

As described above, network equipment in one or more regions may be misconfigured and unable to provide optimal network performance. Network equipment, UEs, and/or other components in a core network and/or access network(s) of the telecommunications network can monitor network conditions, storing such data in a data store. For example, monitored network conditions can include information identifying a type of data technology capability used by a UE (e.g., 3G, 4G, LTE, etc.), what percentage of the total data usage in a session was at the highest data technology capability of a UE (e.g., if the UE is LTE capable, what percentage of the total data usage in a session was at LTE rather than at lower technology capabilities like 3G, 4G, etc.), how long a UE data session lasted, the data transfer rate or throughput of data transferred to and/or from a UE, whether a phone call received or initiated by a UE was dropped, the length of a phone call received or initiated by a UE, whether there was any interference in a signal transmitted to and/or from a UE, a strength of a signal between a UE and a cellular tower, etc. The monitored network conditions are generally associated or obtained from a single UE or a group of UEs in communication with each other.

A separate system, such as a key performance indicator (KPI) generator system, can retrieve the network conditions data stored in the data store and use the network conditions data to generate a set of KPIs that each indicate how a telecommunications network is performing. In particular, the KPIs can represent how the network is performing in the aggregate (e.g., taking into account some or all of the monitored network conditions associated or obtained from UEs). For example, KPIs can include voice accessibility (e.g., the ability of a user using a voice service to access the telecommunications network), a voice drop call rate (e.g., a percentage of all voice-based phone calls that are dropped over a certain time period), a session initiation protocol (SIP) drop call rate (e.g., a percentage of all Internet protocol (IP) network-based phone calls that are dropped over a certain time period), a combined drop call rate (e.g., a percentage of all voice-based and IP network-based phone calls that are dropped over a certain time period), UE downlink throughput (e.g., a data transfer rate supported by the telecommunications network for communications transmitted to UEs), UE uplink throughput (e.g., a data transfer rate supported by the telecommunications network for communications transmitted from UEs), leakage (e.g., a percentage of time that a UE with higher technology capabilities (e.g., LTE) is using lower technology capabilities (e.g., 3G, 4G, etc.)), network interference (e.g., signal to interference and noise ratio (SINR) for physical uplink shared channel (PUSCH), a percentage of cell sectors in a region that are congested, etc.), average signal strength of signals received by UEs, total voice traffic, total data traffic, and/or other data points that describe technical, operational attributes of a telecommunications network.

The KPI generator system can generate KPIs for one or more geographic regions. For example, network conditions can be monitored in a plurality of geographic regions, and the network conditions monitored in one geographic region can be used to generate a set of KPIs for that geographic region. Thus, the KPIs of a first geographic region can be analyzed to assess the network performance within the first geographic region.

Typically, a network operator could retrieve the KPIs for a specific geographic region, identify a KPI that has poor results (e.g., identify that the voice drop call rate is high), and adjust the operation of network equipment within the geographic region to improve the poorly performing KPI. However, this approach may not yield the desired results. For example, some or all KPIs are inter-dependent. In other words, the value of one KPI may affect the value of another KPI. Thus, improving one KPI may have the unintended consequence of degrading another KPI. There may be hundreds of KPIs, and so it may be difficult to discern which KPIs are inter-dependent and/or how changing one KPI may affect another. Conventional systems provide no mechanism for automatically identifying an adjustment to one or more network equipment parameters that would result in an improvement to the overall performance of a telecommunications network and suggesting and/or applying this adjustment.

Accordingly, described herein is a network equipment operation adjustment system configured to improve the performance of a telecommunications network by generating a network score representing the performance of a telecommunications network within a geographic region, determining one or more network equipment parameter adjustments using the network score, and causing the adjustments to occur. The network equipment operation adjustment system can further display the network score and other network scores for other geographic regions in an interactive user interface to efficiently allow a network operator to view the network performance of a telecommunications network by geographic region and/or to view how the network performance in each of the geographic regions is changing over time.

The foregoing aspects and many of the attendant advantages of this disclosure will become more readily appreciated as the same become better understood by reference to the following detailed description, when taken in conjunction with the accompanying drawings.

Example Network Equipment Operation Adjustment Environment

FIG. 1 is a block diagram of an illustrative network equipment operation adjustment environment 100 in which a network equipment operation adjustment system 140 generates one or more network scores, generates user interface data for displaying the network score(s), and uses the network score(s) to control network equipment 130 and/or components in an access network 120. The environment 100 includes a core network 110, one or more UEs 102 that communicate with the core network 110 via the access network 120, and one or more end user devices 104 that communicate with the core network 110 via the access network 120. The core network 110 includes the network equipment 130, the network equipment operation adjustment system 140, and a KPI generator system 150.

The UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the UE 102 includes a wide variety of software and hardware components for establishing communications over one or more communication networks, including the access network 120, the core network 110, and/or other private or public networks. For example, the UE 102 may include a subscriber identification module (SIM) card (e.g., an integrated circuit that stores data to identify and authenticate a UE that communicates over a telecommunications network) and/or other component(s) that enable the UE 102 to communicate over the access network 120, the core network 110, and/or other private or public networks via a radio area network (RAN) and/or a wireless local area network (WLAN). The SIM card may be assigned to a particular user account.

The end user devices UE 104 can also each be any computing device, such as a desktop, laptop or tablet computer, personal computer, wearable computer, server, personal digital assistant (PDA), hybrid PDA/mobile phone, electronic book reader, appliance, integrated component for inclusion in computing devices, home electronics, vehicle, machinery, landline telephone, network-based telephone, cordless telephone, cellular telephone, smart phone, modem, gaming device, media device, control system, and/or any other type of IoT device or equipment. In an illustrative embodiment, the end user devices 104 include a wide variety of software and hardware components for establishing communications over one or more communication networks, including the access network 120, the core network 110, and/or other private or public networks. However, while some end user devices 104 may include the same communication components as the UE 102, other end user devices 104 may not include a SIM card or other component(s) that enables the respective end user device 104 to communicate over the access network 120, the core network 110, and/or other private or public networks via a RAN. Rather, the end user devices 104 may be configured to communicate over the access network 120, the core network 110, and/or other private or public networks via a WLAN.

The UEs 102 and/or end user devices 104 are communicatively connected to the core network 110 via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102 and/or end user devices 104 to communicate via the fixed-location transceivers. Although the access network 120 is illustrated as a single network, one skilled in the relevant art will appreciate that the access network can be include any number of public or private communication networks and/or network connections.

The core network 110 provides various services to UEs 102 and/or end user devices 104 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include a call routing system, which routes telephone calls, messages, and/or other data across a PSTN or IMS. The network equipment 130 may include components of the PSTN, components of the IMS, the call routing system, and/or other physical components or computing devices that enable the routing of telephone calls, messages, and/or other data. The core network 110 may provide high capacity communication facilities that connect various nodes implemented on one or more computing devices, allowing the nodes to exchange information via various paths.

Certain core network 110 nodes may be associated with the network equipment operation adjustment system 140 and other core network 110 nodes may be associated with the KPI generator system 150. Alternatively, not shown, the network equipment operation adjustment system 140 and/or the KPI generator system 150 can be located external to the core network 110 (e.g., in another network that can access the core network 110 to retrieve desired data, such as network performance data or KPI data).

The KPI generator system 150 can retrieve network performance data from network performance data store 170 to generate one or more KPIs for one or more geographic regions. For example, the network performance data can include network conditions monitored by UEs 102 (e.g., network conditions monitored by a network application running on the UE 102, by a third party application running on the UE 102, etc.), components of the access network 120 (e.g., a cell site, a base station, a cellular tower, etc.), and/or by the network equipment 130. The network performance data can be stored in the network performance data store 170 in entries associated with a particular geographic region. Thus, the KPI generator system 150 can generate one or more KPIs for a first geographic region by retrieving the network performance data corresponding to the first geographic region. The KPI generator system 150 can generate a KPI by aggregating, processing, and/or performing mathematical operations on some or all of the retrieved network performance data. As an illustrative example, the KPI generator system 150 can generate a voice drop call rate for a first period of time for a first geographic region by retrieving the network performance data corresponding to the first geographic region, using the retrieved network performance data to identify a number of voice calls made by UEs 102 during the first period of time and a number of times the voice calls were dropped. The KPI generator system 150 can then divide the number of times the voice calls were dropped by the number of voice calls made by UEs 102 during the first period of time to generate the voice drop call rate. The KPI generator system 150 can periodically generate KPIs (e.g., in periodic cycles, when new network performance data is available in the network performance data store 170, when a request is received from an end user device 104, etc.).

Once the KPI(s) are generated for a first geographic region, the KPI generator system 150 can store the KPI(s) in KPI data store 160. The KPI generator 150 can then repeat this process for other geographic regions. Generally, KPIs correspond with a certain period of time (e.g., a past minute, a past hour, a past day, a past week, a past month, etc.). Thus, the KPI generator system 150 can store a KPI in the KPI data store 160 in an entry associated with the period of time to which the KPI corresponds and the geographic region to which the KPI corresponds. Accordingly, over time, the KPI data store 160 includes entries representing the history of KPI values.

As illustrated in FIG. 1, the network equipment operation adjustment system 140 may include several components and/or data repositories, such as a network score generator 142, a network equipment controller 144, a user interface generator 146, a region KPI goal data store 147, and a network score data store 149. In an embodiment, the network score generator 142 generates a network score for a geographic region that represents the overall performance of the telecommunications network in that geographic region. The network score generator 142 can generate a network score for each of a plurality of geographic regions.

For example, a network score generated by the network score generator 142 for a geographic region can be based on how well the KPIs in the geographic region compare to the KPI goals of the geographic region (represented by a region score), how well the KPIs in the geographic region compare to the corresponding KPIs in other geographic regions (represented by a national score), and/or extra data that may indicate "good behavior" by the telecommunications network in the geographic region (represented by an extra score). The network score generator 142 can combine a region score for the geographic region, a national score for the geographic region, and an extra score for the geographic region to form the network score for the geographic region.

In particular, a KPI goal can be a KPI value that the telecommunications network in a geographic region is trying to achieve. As an illustrative example, one KPI may be UE 102 uplink throughput. The KPI goal for this KPI in a first geographic region may be 3.0 Mb/s, meaning that a goal of the telecommunications network in the first geographic region is to achieve a total or average UE 102 uplink throughput of greater than 3.0 Mb/s during a certain period of time (e.g., a past minute, a past hour, a past day, a past week, a past month, etc.).

Accordingly, to determine the region score for a geographic region, the network score generator 142 can retrieve KPI goal data (e.g., a set of KPI goals for various KPIs) for the geographic region from the region KPI goal data store 147 and KPI data (e.g., a set of current KPI values for various KPIs) for the geographic region from the KPI data store 160. For each KPI, the network score generator 142 can compare the current value of the respective KPI with the KPI goal corresponding to the respective KPI. If the comparison yields a result indicating that the current KPI value is better than the KPI goal (e.g., the current KPI value is greater than the KPI goal for KPIs like UE 102 uplink throughput, voice accessibility, etc., and is less than the KPI goal for KPIs like voice drop call rate, leakage, PUSCH SINR, etc.), then the network score generator 142 can increase a region score of the geographic region by 1 (or any other numerical value). On the other hand, if the comparison yields a result indicating that the current KPI value is worse than the KPI goal, then the network score generator 142 can leave the region score of the geographic region unchanged (or decrease the region score of the geographic region by 1 or any other numerical value). Thus, the network score generator 142 can iterate through each KPI, incrementing the region score of the geographic region by 1 (or any other numerical value) each time a current KPI value is better than the KPI goal.

To determine the national score, the network score generator 142 can retrieve KPI data for some or all geographic regions from the KPI data store 160. For each KPI, the network score generator 142 can rank the geographic regions by current KPI value of the respective KPI. As an illustrative example, if a first geographic region has a voice drop call rate of 0.6%, a second geographic region has a voice drop call rate of 0.4%, and a third geographic region has a voice drop call rate of 0.7%, then the network score generator 142 can rank the second geographic region first (e.g., because the second geographic region has the lowest voice drop call rate), the first geographic region second, and the third geographic region third. Thus, the network score generator 142 can generate N geographic region rankings, where N corresponds to the number of KPIs that are being evaluated.

For each ranking, the network score generator 142 then assigns ranking scores to the geographic regions in the respective ranking. For example, a geographic region with the highest rank in one ranking is assigned a highest ranking score (e.g., a score corresponding to the number of geographic regions that are ranked), a geographic region with the lowest ranking in the one ranking is assigned a lowest ranking score (e.g., 0), and the remaining geographic regions are assigned ranking scores in between the highest and lowest ranking scores that are dependent on the respective geographic region's rank. The network score generator 142 can then sum all of the ranking scores assigned to a particular geographic region across the different rankings to determine the national score for that geographic region. As an illustrative example, if N is 3 and a first geographic region is assigned a ranking score of 1 in a first ranking (e.g., corresponding to a first KPI), a ranking score of 4 in a second ranking (e.g., corresponding to a second KPI), and a ranking score of 7 in a third ranking (e.g., corresponding to a third KPI), then the national score for the first geographic region is 12.

As another example, the network score generator 142, for each ranking, identifies an average KPI value of the geographic regions that are ranked. The network score generator 142 then assigns a ranking score of 1 (or any other numerical value) to each of the geographic regions in the respective ranking that have a current KPI value greater than (or equal to) the average KPI value and a ranking score of 0 (or any other numerical value) to each of the geographic regions in the respective ranking that have a current KPI value less than (or equal to) the average KPI value. The network score generator 142 can then sum all of the ranking scores assigned to a particular geographic region across the different rankings to determine the national score for that geographic region. As an illustrative example, if a first geographic region is assigned a ranking score of 1 in a first ranking (e.g., because the current KPI value of the first geographic region is greater than the average KPI value of a first KPI corresponding to the first ranking), a ranking score of 0 in a second ranking (e.g., because the current KPI value of the first geographic region is less than the average KPI value of a second KPI corresponding to the second ranking), and a ranking score of 1 in a third ranking (e.g., because the current KPI value of the first geographic region is greater than the average KPI value of a third KPI corresponding to the third ranking), then the national score for the first geographic region is 2.

To determine the extra score, the network score generator 142 can identify a set of metrics that represent "good behavior" by a network in a geographic region. For example, such metrics can include whether a certain application is run by a threshold percentage of UEs 102 in a geographic region, whether data measured by a third party application (e.g., data throughput) running on UEs 102 in a geographic region exceeds a threshold value in the aggregate, whether signal coverage of one or more base stations in a geographic region exceeds a threshold area, whether network interference in a geographic region has decreased over a certain period of time by a threshold percentage or amount, whether a threshold percentage or portion of the network in a geographic region is a self organizing network (SON) (e.g., a network that configures itself to optimize performance), and/or other metrics that may indicate that network performance in the geographic region is exceeding user and/or network operator expectations. The metrics may define a single score tier (e.g., a 1 if the metric is met, a 0 if the metric is not met) or multiple score tiers (e.g., a 1 if a baseline version of the metric is met, a 2 if an enhanced version of the metric is met, a 0 if the metric is not met, etc.).

The network score generator 142 can then process, for a geographic region, the KPI data, the KPI goal data, and/or other metric data obtained from an external source (not shown) to determine the extra score. For example, the network score generator 142 can increment the extra score for a geographic region by 1 (or any other numerical value, such as greater values if the metric defines multiple score tiers) each time the processed data indicates that the geographic region complies with a metric. As an illustrative example, if a metric indicates that 70% application usage results in a 1, whereas 80% application usage results in a 2, 71% of the UEs 102 located in a first geographic region use an application, 85% of the UEs 102 located in a second geographic region use the application, and 69% of the UEs 102 located in a third geographic region use the application, then the extra score for the first geographic region can be incremented by 1, the extra score for the second geographic region can be incremented by 2, and the extra score for the third geographic region can remain unchanged. Thus, the network score generator 142 can iterate through each metric, incrementing the extra score of a geographic region by 1 (or any other numerical value) each time the geographic region complies with the respective metric.

For each geographic region, the network score generator 142 sums the region score of the respective geographic region, the national score of the respective geographic region, and the extra score of the respective geographic region to determine the network score of the respective geographic region. The network score generator 142 then stores the generated network scores in the network score data store 149. Each network score can be stored in association with a geographic region and a time or time period corresponding to the time or time period of the KPIs used to generate the network score.

The network equipment controller 144 can be configured to use one or more network scores in order to adjust the operation of a network equipment 130 and/or a component in the access network 120 (e.g., a cell site, a base station, a cellular tower, etc.). For example, the network equipment controller 144 can use machine learning to determine an adjustment to the operation of a network equipment 130 and/or a component in the access network 120. In particular, the network equipment controller 144 can train a machine learning model that identifies a network equipment 130 or access network 120 component to reconfigure and/or one or more parameters to adjust. The network equipment controller 144 can train the machine learning model on training data that includes information identifying a past network score of a geographic region, past KPI value(s) for one or more KPI(s) of the geographic region, what network equipment 130 and/or access network 120 components were reconfigured in the geographic region, what parameter(s) were changed and how were those parameter(s) changed to implement the reconfiguration, and/or how did the change affect the network score of the geographic region going forward. Optionally, the training data can further include trend information (e.g., how the network score and/or the KPI value(s) have changed over a period of time). The machine learning model can be trained to identify adjustments that would result in an improved network score, which would result in an improved network performance.

To determine an adjustment, the network equipment controller 144 can retrieve one or more network scores for a geographic region from the network score data store 149 and one or more KPI value(s) from the KPI data store 160 (e.g., a single KPI value for each of a plurality of KPIs, a set of KPI values for each of a plurality of KPIs (e.g., a set of historical KPI values), etc.). The network equipment controller 144 can then apply the retrieved network score(s) and/or the retrieved KPI value(s) as inputs to the machine learning model. As a result, the machine learning model may produce an identification of a network equipment 130 and/or access network 120 component to reconfigure and/or one or more parameters to adjust and what the adjustment should be. In response, the network equipment controller 144 can transmit an instruction to the identified network equipment 130 and/or access network 120 component that identifies one or more parameters to adjust and what the adjustment should be. Receipt of the instruction causes the receiving component to implement indicated parameter adjustment. Thus, the network score generated by the network score generator 142 can be used to physically alter the operation of physical network equipment to improve the performance of a telecommunications network within a geographic region.

As an illustrative example, the result produced by the machine learning model may indicate that the signal strength of a cellular tower should be increased by 10%. Thus, the network equipment controller 144 can transmit an instruction to the cellular tower to increase signal strength by 10%. Receipt of the instruction may cause the cellular tower to increase the power of the signal transmission (e.g., by 10% or another percent value that corresponds with a signal strength increase of 10%) such that the signal strength increases by 10%.

In some embodiments, the network equipment controller 144 can transmit instructions to physical network equipment to improve the network performance without using a machine learning model. For example, a network operator can access the network equipment operation adjustment system 140 (e.g., via an end user device 104) and view network score and/or KPI information for a geographic region in a user interface (e.g., as described in greater detail below). Based on the viewed information, the network operator can identify changes to the way the access network 120 and/or the core network 110 operate to improve network performance (e.g., change network equipment 130 or access network 120 component parameters, such as by changing the direction in which signals are transmitted, changing the signal strength, changing the ratio of resources allocated to voice and data traffic, etc., add new cellular towers, etc.) and instruct the network equipment controller 144 to transmit an instruction constructed by the network operator based on the identified changes.

The user interface generator 146 can retrieve one or more network scores from the network score data store 149 in order to generate user interface data that, when executed by an end user device 104, causes the end user device 104 to display an interactive user interface that displays the network scores and/or other information. The interactive user interfaces are described in greater detail below with respect to FIGS. 4A-4G.

The network equipment operation adjustment system 140 and/or the KPI generator system 150 may be a single computing device or may include multiple distinct computing devices, such as computer servers, logically or physically grouped together to collectively operate as a server system. The components of the network equipment operation adjustment system 140 and/or the KPI generator system 150 can each be implemented in application-specific hardware (e.g., a server computing device with one or more ASICs) such that no software is necessary, or as a combination of hardware and software. In addition, the modules and components of the network equipment operation adjustment system 140 and/or the KPI generator system 150 can be combined on one server computing device or separated individually or into groups on several server computing devices. In some embodiments, the network equipment operation adjustment system 140 and/or the KPI generator system 150 may include additional or fewer components than illustrated in FIG. 1.

The region KPI goal data store 147 stores KPI goal data for a plurality of KPIs and for a plurality of geographic regions. While the region KPI goal data store 147 is depicted as being located internal to the network equipment operation adjustment system 140, this is not meant to be limiting. For example, in some embodiments not shown, the region KPI goal data store 147 is located external to the network equipment operation adjustment system 140.

The network score data store 149 stores network scores for a plurality of geographic regions. The network score generator 142 can periodically generate a new network score for each geographic region (e.g., each hour, each day, each week, each month, etc.) and store the new network score in the network score data store 149. Thus, the network score data store 149 can include a plurality of network scores for a single geographic region. While the network score data store 149 is depicted as being located internal to the network equipment operation adjustment system 140, this is not meant to be limiting. For example, in some embodiments not shown, the network score data store 149 is located external to the network equipment operation adjustment system 140.

The KPI data store 160 stores KPI data for a plurality of KPIs and for a plurality of geographic regions. While the KPI data store 160 is depicted as being located external to the network equipment operation adjustment system 140 and the KPI generator system 150, this is not meant to be limiting. For example, in some embodiments not shown, the KPI data store 160 is located internal to the network equipment operation adjustment system 140 and/or the KPI generator system 150.

The network performance data store 170 stores network performance data for a plurality of geographic regions. While the network performance data store 170 is depicted as being located external to the network equipment operation adjustment system 140 and the KPI generator system 150, this is not meant to be limiting. For example, in some embodiments not shown, the network performance data store 170 is located internal to the network equipment operation adjustment system 140 and/or the KPI generator system 150.

Example Block Diagram for Generating KPIs

Figure 2:
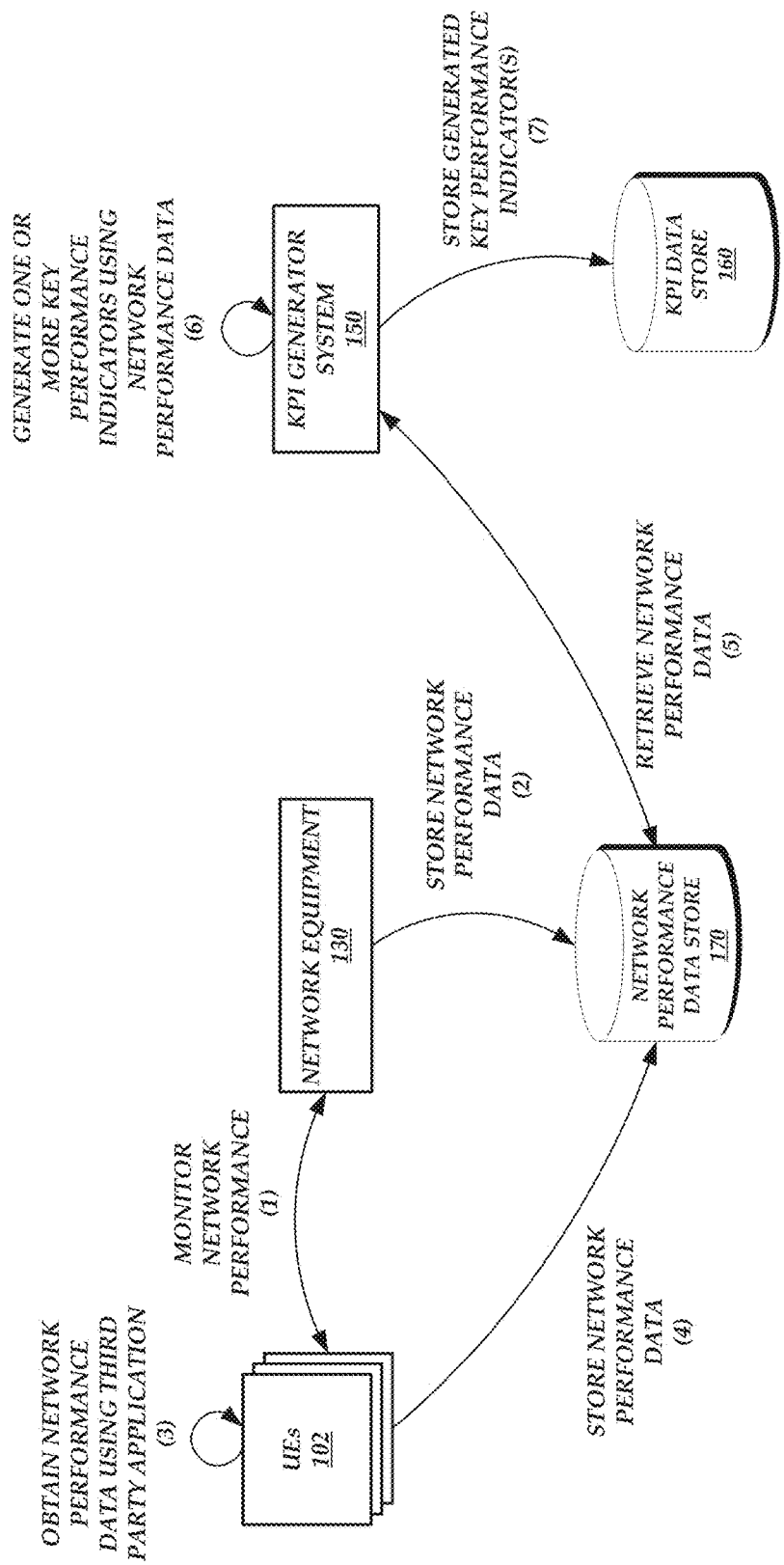
FIG. 2 is a block diagram of the network equipment operation adjustment environment of FIG. 1 illustrating the operations performed by the components of the network equipment operation adjustment environment to generate KPIs, according to one embodiment.

FIG. 2 is a block diagram of the network equipment operation adjustment environment 100 of FIG. 1 illustrating the operations performed by the components of the network equipment operation adjustment environment 100 to generate KPIs, according to one embodiment. As illustrated in FIG. 2, the network equipment 130 monitors network performance of one or more UEs at (1). The network equipment 130 stores network performance data corresponding to the monitoring in the network performance data store 170 at (2). The network equipment 130 can store the network performance data in an entry associated with the geographic region(s) in which the UEs 102 are located.

Before, during, or after the network equipment 130 monitors the network performance of the one or more UEs 102, one or more UEs 102 can obtain network performance data using a third party application running on the UE(s) 102 at (3). As an illustrative example, a third party application may be configured to measure the uplink and/or downlink throughput of the network in the geographic region in which the UE 102 running the third party application is located. The third party application can then store the obtained network performance data in the network performance data store 170 at (4).

Optionally, other components, such as components in the access network 120, can monitor, generate, or otherwise obtain network performance data. Such components can store the network performance data in the network performance data store 170.

The KPI generator system 150 can retrieve the network performance data at (5). The KPI generator system 150 can then generate one or more KPIs using the network performance data at (6). Once the KPI(s) are generated, the KPI generator system 150 stores the generated KPI(s) in the KPI data store 160 at (7). As described herein, the generated KPI(s) can be stored in association with a geographic region corresponding to the network performance data used to generate the KPI(s).

Example Block Diagram for Generating and Using Network Scores

Figure 3A:
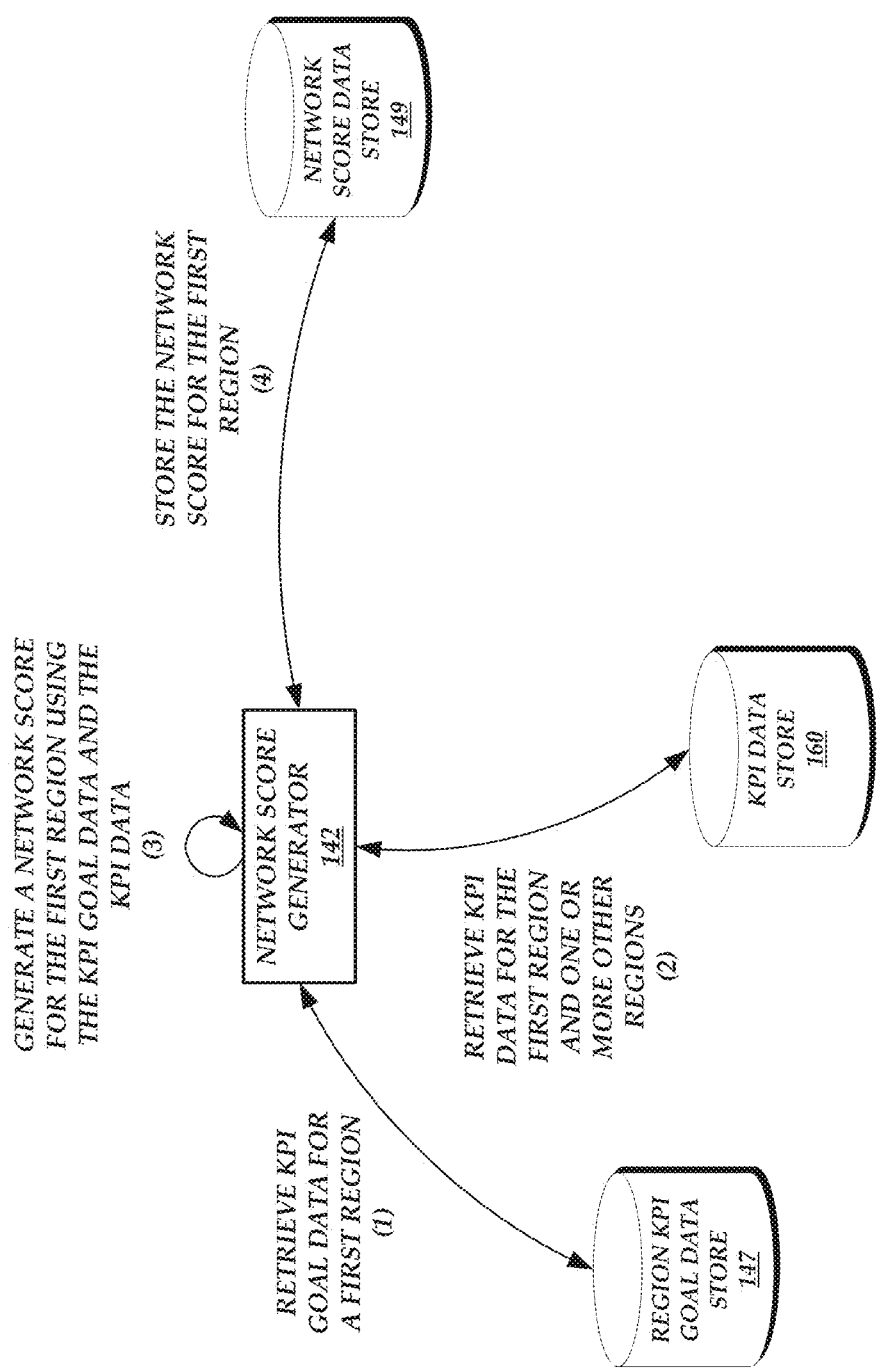
FIG. 3A is a block diagram of the network equipment operation adjustment environment of FIG. 1 illustrating the operations performed by the components of the network equipment operation adjustment environment to generate a network score, according to one embodiment.

FIG. 3A is a block diagram of the network equipment operation adjustment environment 100 of FIG. 1 illustrating the operations performed by the components of the network equipment operation adjustment environment 100 to generate a network score, according to one embodiment. As illustrated in FIG. 3A, the network score generator 142 can retrieve KPI goal data for a first region at (1). For example, a region or geographic region can include a cellular site, a city, a county, a state, etc.

The network score generator 142 can further retrieve KPI data for the first region and one or more other regions at (2). The network score generator 142 can then generate a network score for the first region using the retrieved KPI goal data and the KPI data at (3). For example, the network score generator 142 can use the KPI data for the first region in conjunction with the KPI data for the other regions to determine a region score for the first region. The network score generator 142 can use the KPI data for the first region and the other regions to determine a national score for the first region. Optionally, the network score generator 142 can retrieve other metric data to use in conjunction with the KPI data to determine an extra score for the first region. The network score generator 142 can then sum the region score, the national score, and the extra score to generate the network score for the first region. The network score generator 142 can then store the network score for the first region in the network score data store 149 at (4).

In some embodiments, the network score generator 142 can repeat the operations described above to generate a network score for each of a plurality of regions. The network score generator 142 can store these network scores in the network score data store 149. In addition, the network score generator 142 can repeat these operations periodically for one or more regions, thereby generating multiple network scores for a given region.

Figure 3B:
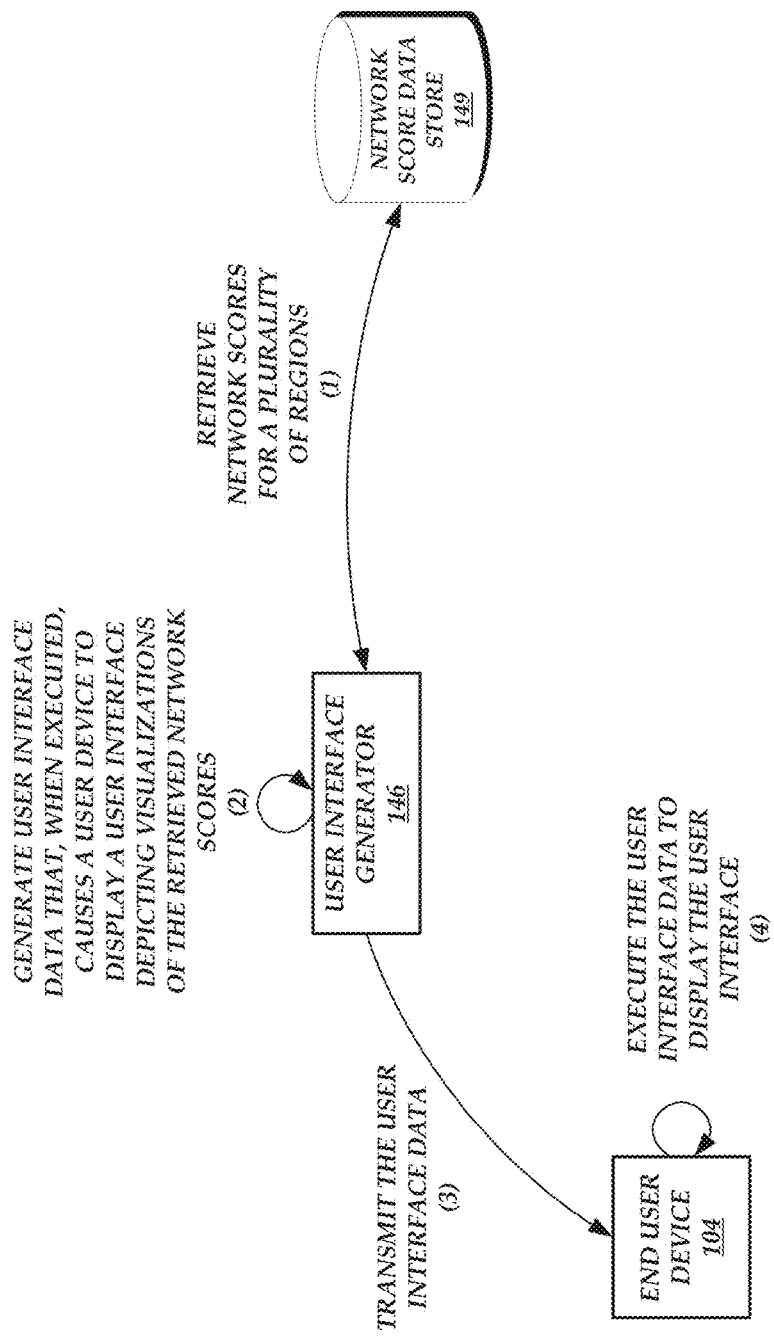
FIG. 3B is a block diagram of the network equipment operation adjustment environment of FIG. 1 illustrating the operations performed by the components of the network equipment operation adjustment environment to generate user interface data that, when executed, causes a user device to display a user interface depicting one or more network scores, according to one embodiment.

FIG. 3B is a block diagram of the network equipment operation adjustment environment 100 of FIG. 1 illustrating the operations performed by the components of the network equipment operation adjustment environment 100 to generate user interface data that, when executed, causes a user device to display a user interface depicting one or more network scores, according to one embodiment. As illustrated in FIG. 3B, the user interface generator 146 retrieves network scores for a plurality of regions from the network score data store 149 at (1).

The user interface generator 146 then generates user interface data that, when executed, causes a user device (e.g., an end user device 104) to display a user interface depicting visualizations of the retrieved network scores at (2). For example, user interfaces have a finite amount of space, and so it can be difficult to display a large amount of data given the finite amount of space. This can be especially problematic in situations in which a network operator or other user desires to view not only the network scores, but also other information, such as network score trends, what KPIs are positively and/or negatively impacting network scores, how network scores and/or KPI values differ region by region, and/or the like. Thus, the user interface displayed as a result of executing the user interface data generated by the user interface generator 146 may be configured in a manner to overcome the size constraints presented by a typical user interface. Additional details of the user interface are described below with respect to FIGS. 4A-4G.

The user interface generator 146 can transmit the user interface data to the end user device 104 at (3). The end user device 104 can then execute the user interface data to display the user interface at (4).

Figure 3C:
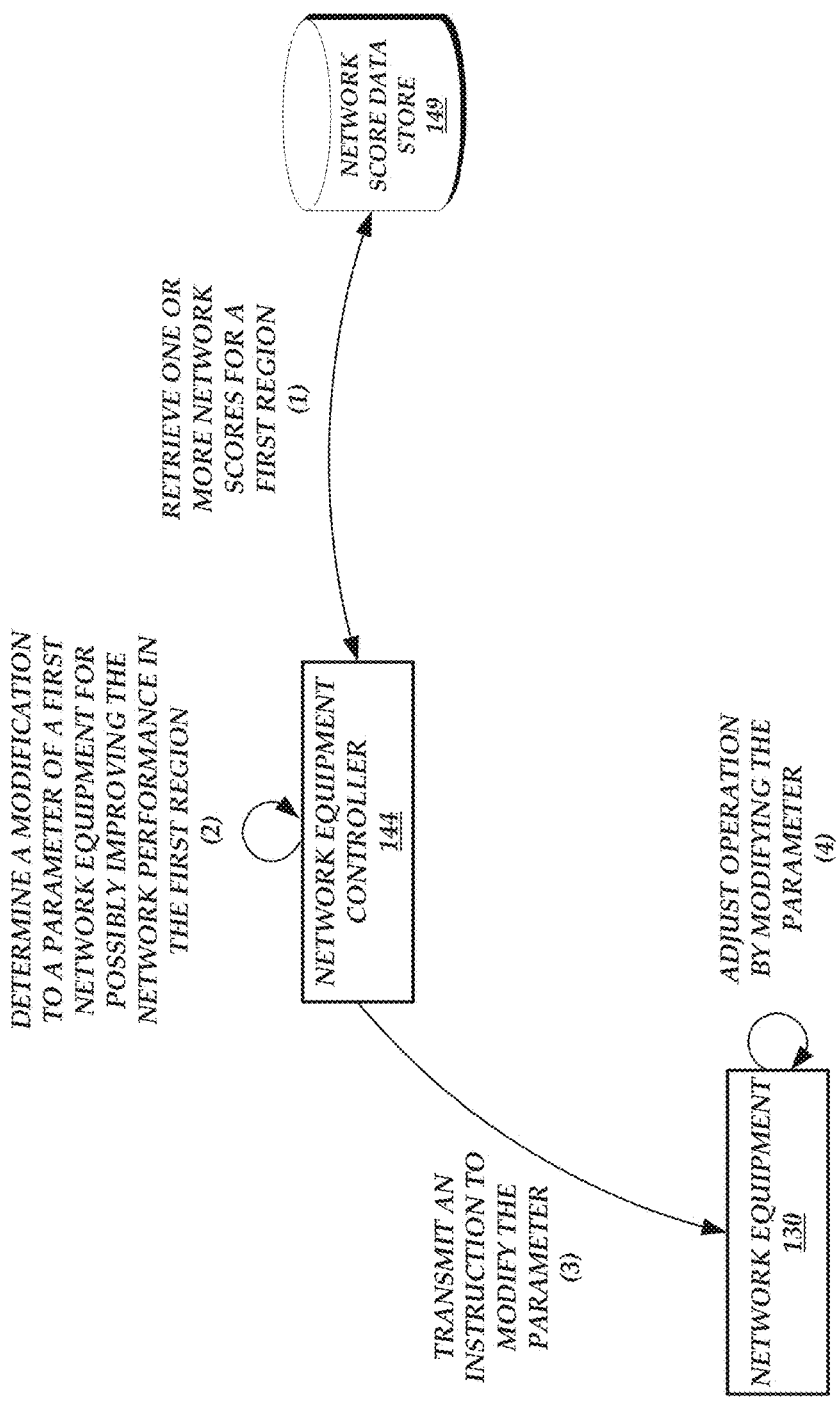
FIG. 3C is a block diagram of the network equipment operation adjustment environment of FIG. 1 illustrating the operations performed by the components of the network equipment operation adjustment environment to automatically reconfigure network equipment, according to one embodiment.

FIG. 3C is a block diagram of the network equipment operation adjustment environment 100 of FIG. 1 illustrating the operations performed by the components of the network equipment operation adjustment environment 100 to automatically reconfigure network equipment, according to one embodiment. As illustrated in FIG. 3C, the network equipment controller 144 retrieves one or more network scores for a first region from the network score data store 149 at (1). In some embodiments, the network equipment controller 144 further retrieves one or more KPI values associated with the first region. In further embodiments, the network equipment controller 144 retrieves a set of historical network scores (e.g., network scores generated over the past 7 days) and/or a set of historical KPI values (e.g., KPI values generated over the past 7 days).

The network equipment controller 144 determines a modification to a parameter of a first network equipment for possibly improving the network performance in the first region at (2). For example, the network equipment controller 144 can use the retrieved network score(s) and/or retrieved KPI value(s) to determine the parameter modification. In some embodiments, the network equipment controller 144 executes a machine learning model, using the retrieved data as an input to the model, to identify the first network equipment to reconfigure and the parameter modification.

The network equipment controller 144 then transmits an instruction to the first network equipment 130 to modify the parameter at (3). In response, the network equipment 130 adjusts its operation by modifying the parameter at (4).

Alternatively or in addition, the network equipment controller 144 identifies an access network 120 component to reconfigure and transmits the instruction to the identified component. In response, the access network 120 component adjusts its operation according to the instruction.

Example Network Score User Interfaces

FIGS. 4A-4G illustrate a user interface 400 that displays network score and/or KPI value information in various configurations to optimize the screen space given the finite amount of space available to display information. The user interface 400 can be displayed by the end user device 104 and user interface data that causes the end user device 104 to display the user interface 400 can be generated by the user interface generator 146 of the network equipment operation adjustment system 140.

Figure 4A:
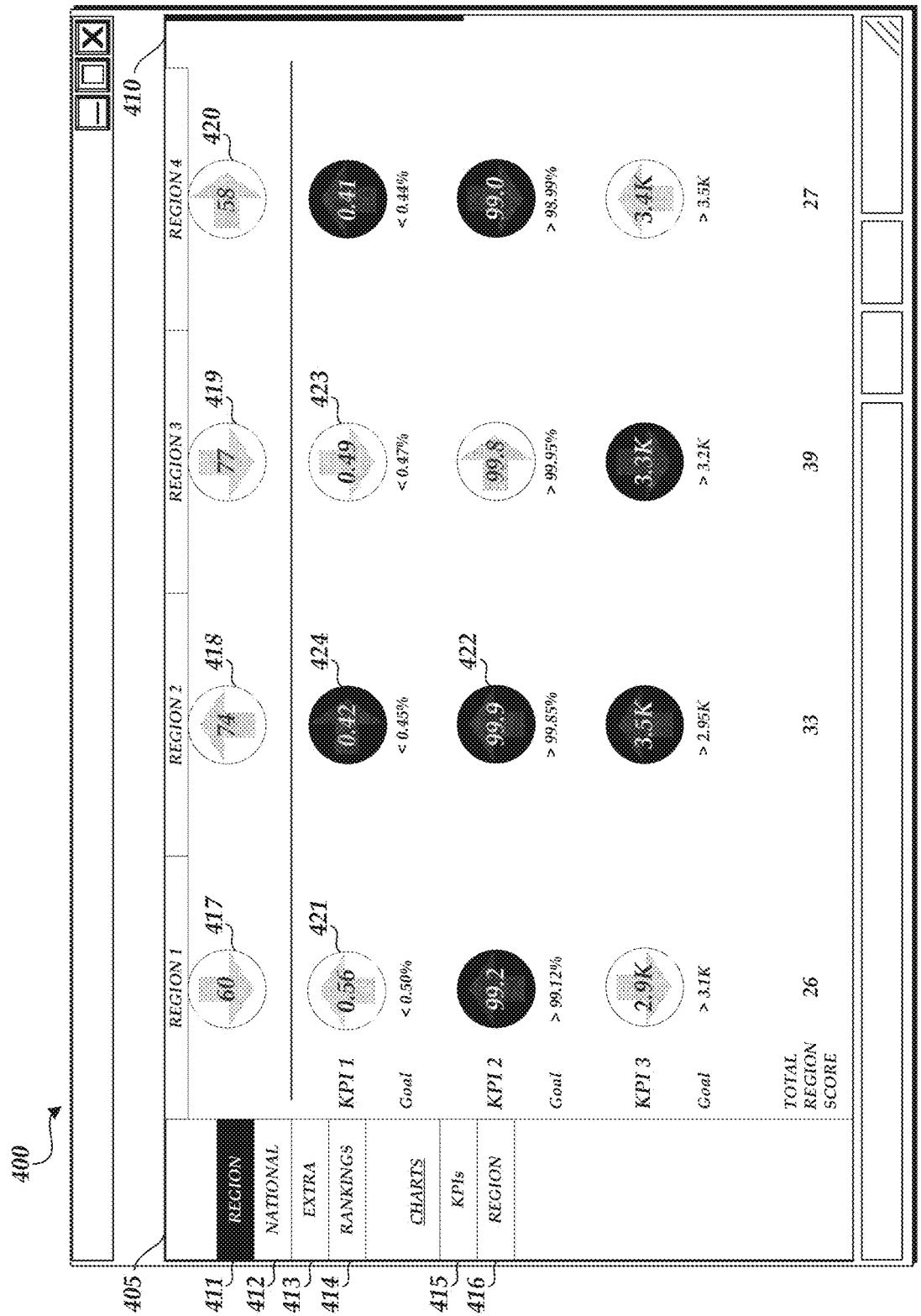
FIGS. 4A-4G illustrate a user interface that displays network score and/or KPI value information in various configurations to optimize the screen space given the finite amount of space available to display information.

As illustrated in FIG. 4A, the user interface 400 includes a window 405 and a window 410. The window 405 includes a region button 411, a national button 412, an extra button 413, a rankings button 414, a KPIs chart button 415, and a region chart button 416. Selection of the region button 411, as depicted in FIG. 4A, causes the window 410 to identify a plurality of regions, where each region occupies a different column in the window 410. Within each column, the network score is depicted for the region corresponding to the respective column (e.g., as displayed in shapes 417-420), network score trend data is depicted (e.g., via the arrows depicted in the shapes 417-420), current KPI values are depicted for the region corresponding to the respective column, KPI value trend data is depicted (e.g., whether the KPI values are trending upward, trending downward, remaining stable, etc.), KPI goal data is depicted for the region corresponding to the respective column, information indicating whether KPI goal data is met, and a region score is depicted for the region corresponding to the respective column.

As described herein, the user interface 400 has a finite amount of space. However, the number of KPIs for each region may be large. Thus, in order to depict all of the information described above in the window 410, the user interface 400 depicts such information in a compact format. For example, the window 410 includes a matrix, where the columns correspond to different regions and the rows correspond to different KPIs. As depicted in FIG. 4A, the first row corresponds to KPI 1, the second row corresponds to KPI 2, the third row corresponds to KPI 3, and so on. Likewise, the first column corresponds to region 1, the second column corresponds to region 2, the third column corresponds to region 4, and so on.

Within each element of the matrix, a shape is displayed (e.g., a circle, a square, a rectangle, etc.), where the shape corresponds to a region and KPI. Within each shape, the window 410 displays a numerical value representing the current KPI value of the corresponding region and KPI. For example, shape 421 is a circle corresponding to region 1 and KPI 1. The numerical value 0.56 in the shape 421 represents the current KPI value of KPI 1 in region 1.

KPI goal data is depicted below the shapes, such as a threshold KPI value and whether the goal is to exceed or not exceed the threshold KPI value. For example, "<0.50%" is depicted below the shape 421, indicating that the threshold KPI value is 0.50% and the goal is to be less than 0.50%. The shapes are further shaded to indicate whether the KPI goal is met. For example, shapes are shaded a dark color if the KPI goal is met and a light color if the KPI goal is not met, or vice-versa. The goal for KPI 1 in region 1 was not met (e.g., 0.56% is greater, not less than, 0.50%) and thus the shape 421 is shaded a light color. On the other hand, the goal for KPI 2 in region 2 was met (e.g., 99.9% is greater, not less than, 99.85%) and thus shape 422 is shaded a dark color.

The numerical values within the shapes may overlay an arrow that indicates the direction in which the respective KPI values have changed over a period of time (e.g., an hour, a day, a week, a month, etc.). For example, the shapes 421 and 422 includes a numerical value laying over an up arrow, indicating that KPI 1 in region 1 and KPI 2 in region 2 are both trending upwards. However, shape 423 includes a numerical value laying over a down arrow, indicating that KPI 1 in region 3 is trending downwards, and shape 424 includes a numerical value laying over a sideways arrow, indicating that KPI 1 in region 2 has remained stable.

In some embodiments, the arrows are not initially depicted in the shapes. Rather, when a user moves a cursor over a shape (e.g., hovers over a shape with a cursor) or otherwise selects the shape, then the arrow appears within the shape. Thus, the user interface 400 can depict the trend information in a compact format without adding additional information to another portion of the user interface 400, causing a new window to pop-up to display the trend information, and/or the like.

Figure 4B:
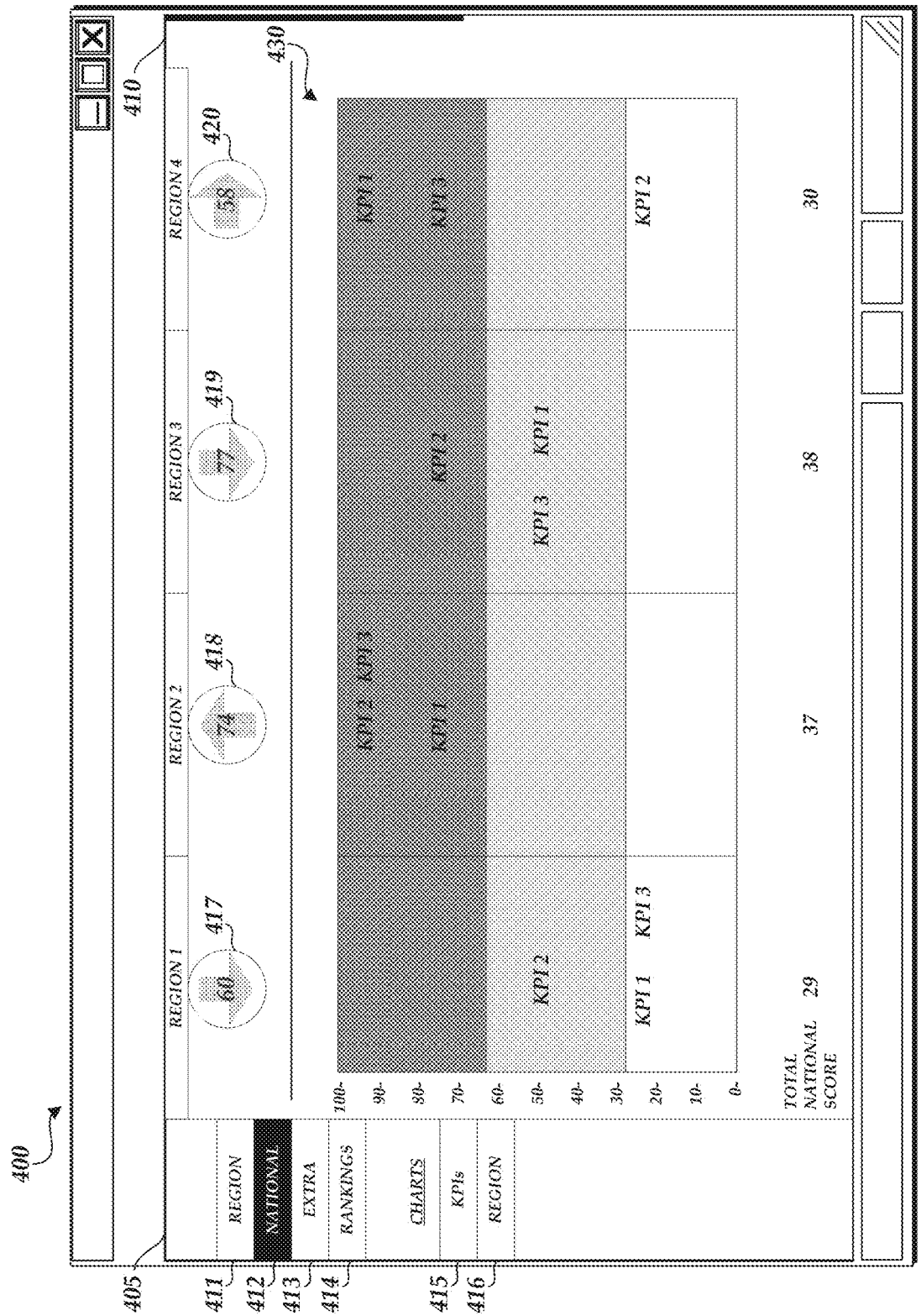

Selection of the national button 412 causes the window 410 to depict a table 430 identifying a plurality of regions and the KPI rankings for each region, as illustrated in FIG. 4B. The window 410 further depicts the national score for each region. As depicted in the table 430, region 1 is ranked lower for KPI 1 and KPI 3, and has a middle rank for KPI 2. On the other hand, region 2 is ranked higher for KPIs 1, 2, and 3. Region 2 may have a higher overall ranking than region 1 because the current KPI 1, 2, and 3 values for region 2 are better (e.g., higher, like for throughput, or lower, like for voice drop call rate) than the current KPI 1, 2, and 3 values for region 1. Similarly, region 3 is ranked higher for KPI 2, and has a middle rank for KPIs 3 and 1. Region 4 is ranked higher for KPIs 1 and 3, and has a lower rank for KPI 2.

Figure 4C:
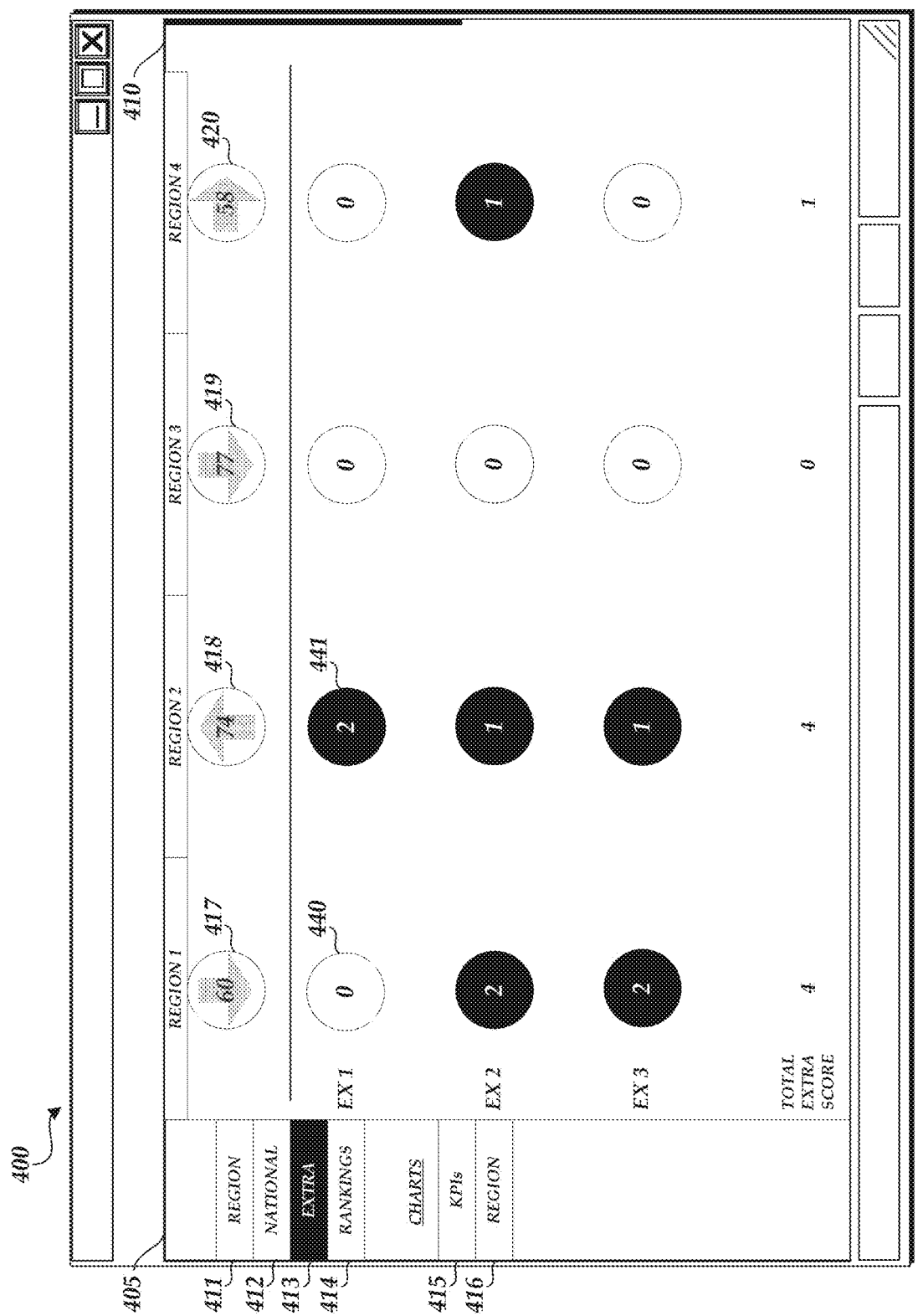

Selection of the extra button 413 causes the window 410 to depict a matrix in which the columns represent different regions and the rows represent various extra metrics, as illustrated in FIG. 4C. The window 410 further depicts the extra score for each region. Within each matrix element, the window 410 displays a shape indicating whether the corresponding extra metric contributed to the extra score for the corresponding region and, if so, by how much. For example, shape 440 corresponds to region 1 and extra metric 1. The shape 440 depicts a numerical value of 0 and is lightly shaded, indicating that the region 1 did not comply with the requirements of extra metric 1. On the other hand, shape 441, which corresponds to region 2 and extra metric 1, depicts a numerical value of 2 and is darkly shaded, indicating that the region 2 complied with one tier of the extra metric 1 (e.g., a tier, such as a higher threshold value, that if met, results in an increment to the extra score by 2).

Figure 4D:
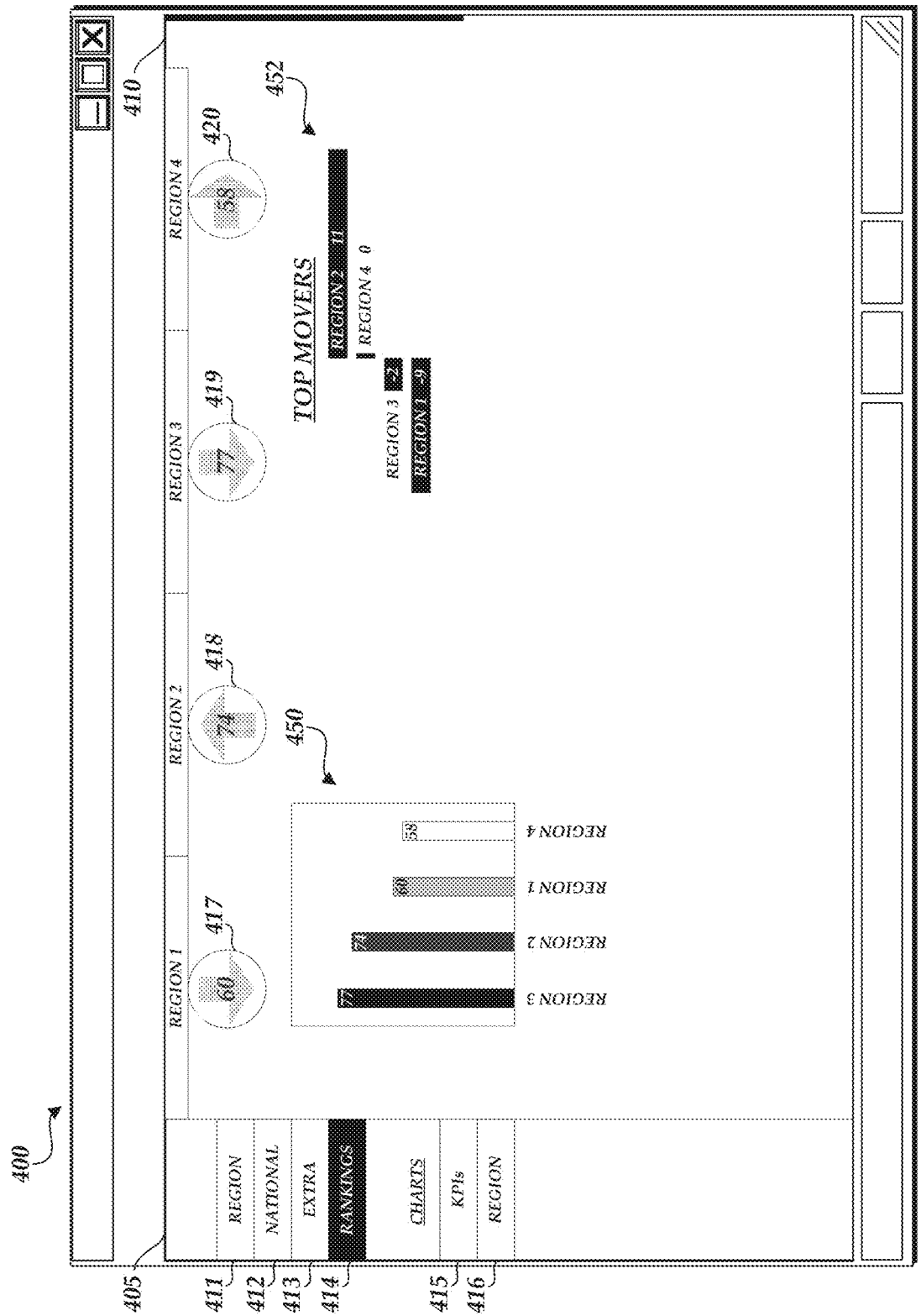

Selection of the rankings button 414 causes the window 410 to depict a vertical bar graph 450 and a horizontal bar graph 452, as illustrated in FIG. 4D. The vertical bar graph 450 may depict, in bar graph form, the network scores for various regions. For example, the vertical bar graph 450 depicts the network scores for regions 1-4. While the regions and the corresponding network scores depicted in shapes 417-420 depicted near the top of the window 410 may be organized in a set manner (e.g., alphabetical, by location, etc.), the regions in the vertical bar graph 450 may be organized from highest network score to lowest network score (e.g., from left to right). Thus, as the network score generator 142 continues to generate network scores, the vertical bar graph 450 may dynamically change the order of regions to reflect the new network scores and the corresponding updated ranking of regions by network score.

The horizontal bar graph 452 can depict trend information, identifying regions that have experienced the largest network score increases over a period of time and the regions that have experienced the largest network score decreases over the same period of time. For example, the horizontal bar graph 452 depicts region 2 as experiencing the largest network score increase (e.g., 11 points over the period of time) and region 1 as experiencing the largest network score decrease (e.g., 9 points over the period of time).

Figure 4E:
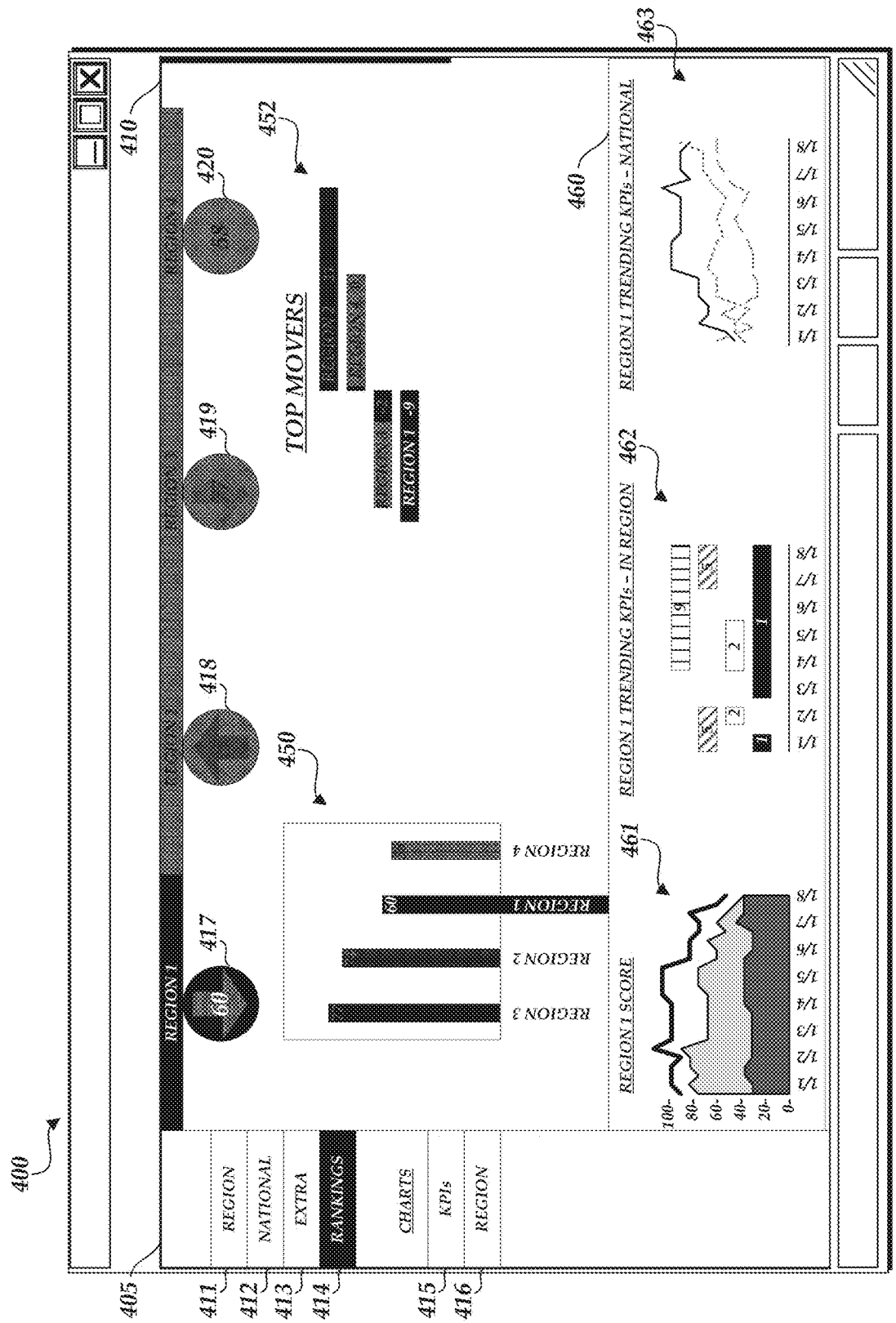

As described herein, a user may desire to view KPI information that can inform the user of why the network score of a particular region is as depicted and/or what KPIs are positively and/or negatively impacting the network score. However, the user interface 400 has a finite amount of space. Thus, in order to depict the KPI information despite the size constraints of the user interface 400, the user interface 400 provides functionality to display the KPI information in a space-efficient manner. For example, selection of region 1 (e.g., via the selection of the shape 417) causes the window 410 to shade and/or highlight the vertical bar graph 450 and the horizontal bar graph 452 such that network score information corresponding to the selected region 1 is more visible than the network score information corresponding to the other, unselected regions, as illustrated in FIG. 4E. Furthermore, selection of region 1 causes the window 410 to display a sub window 460. Within the sub window 460, additional graphs are displayed, including a line graph 461, a horizontal bar graph 462, and a line graph 463.

The line graph 461 depicts the network score of the region 1 over a period of time (e.g., a week). The horizontal bar graph 462 depicts information indicating which KPIs have positively (or negatively) contributed to the region 1 network score over a period of time (e.g., a week). For example, on 1/1, KPIs 1, 2, and 5 positively (or negatively) contributed to the 1/1 region 1 network score. However, on 1/3, only KPI 1 positively (or negatively) contributed to the 1/3 region 1 network score. The line graph 463 depicts the values of various region 1 KPIs over a period of time (e.g., a week). Thus, the graphs 461-463 in the sub window 460 can provide a user with additional insight as to why a network score is as depicted and/or what KPIs are positively or negatively contributing to the network score, and this information along with the network score information provided in vertical bar graph 450 and horizontal bar graph 452 can all be depicted in a manner that overcomes the size constraints of the user interface 400.

Figure 4F:
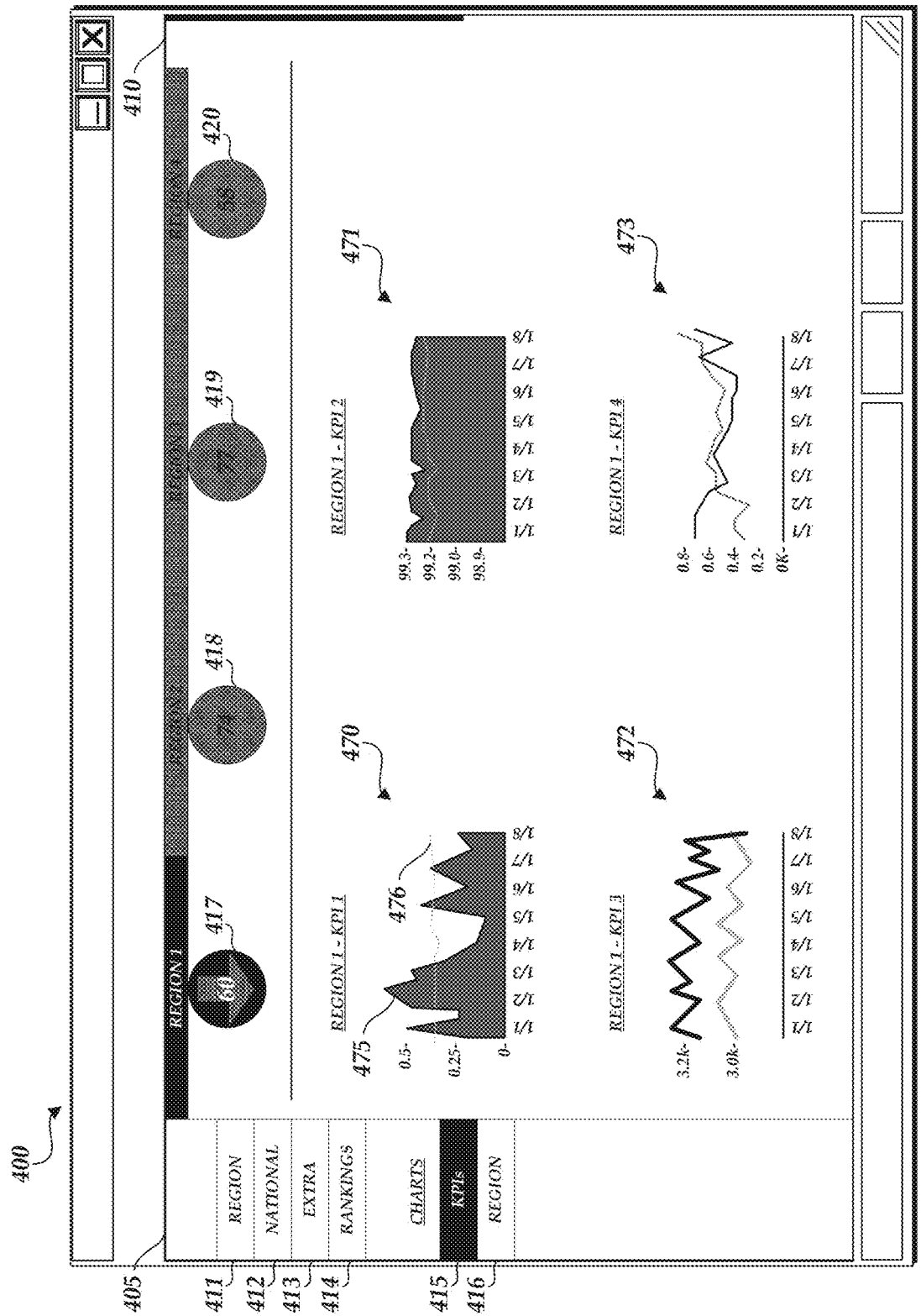

Selection of the KPIs chart button 415 causes the window 410 to display KPI charts 470-473, as illustrated in FIG. 4F. For example, the KPI charts 470-473 correspond with region 1, which is still selected. If, for example, region 2 is selected via the shape 418, then the window 410 automatically updates to display KPI charts corresponding to the selected region 2.

The KPI charts 470-473 may depict KPI information for the telecommunications network operated by the user of the user interface 400. One or more KPI charts 470-473 may also display KPI information for other telecommunications networks operated by other users. For example, the KPI chart 470 includes a line 475 and a line 476. The line 475 represents the KPI 1 value in region 1 for the telecommunications network operated by the user of the user interface 400. The line 476, however, represents the KPI 1 value in region 1 for another telecommunications network operated by another user. Thus, the user can compare the performance of the telecommunications network in region 1 to the performance of other telecommunications networks in region 1 within the same KPI chart 470, thereby reducing the amount of space needed in the user interface 400 to display content.

Figure 4G:
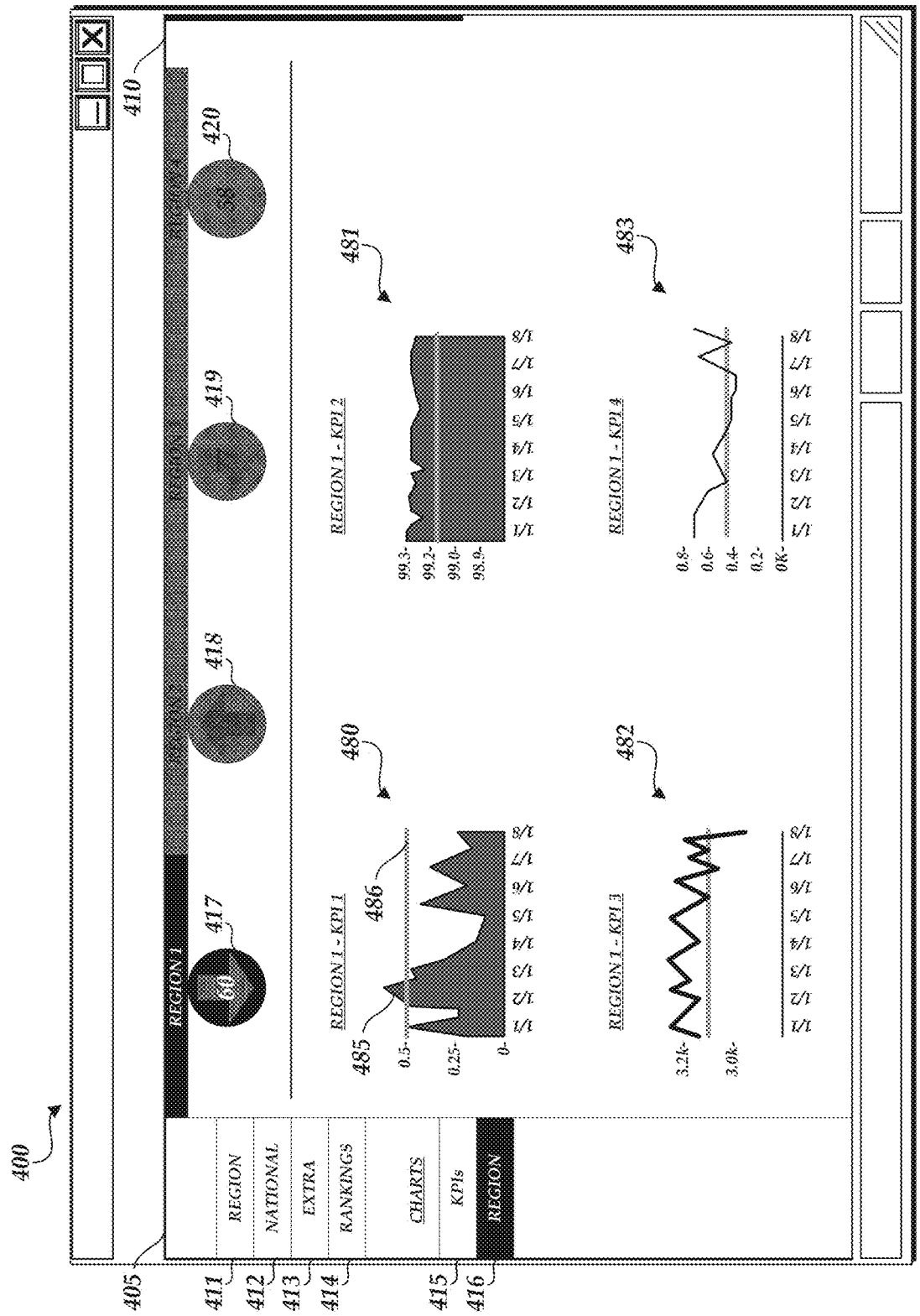

Selection of the region chart button 416 causes the window 410 to display KPI charts 480-483 that depict KPI goal data, as illustrated in FIG. 4G. For example, the KPI charts 480-483 correspond with region 1, which is still selected. If, for example, region 2 is selected via the shape 418, then the window 410 automatically updates to display KPI charts corresponding to the selected region 2.

The KPI charts 480-483 may depict KPI information for the telecommunications network operated by the user of the user interface 400. In addition, each KPI chart 480-483 depicts the KPI goal for the respective KPI. For example, the KPI chart 480 includes a line 485 and a line 486. The line 485 represents the KPI 1 value in region 1 for the telecommunications network operated by the user of the user interface 400. The line 486 represents the KPI goal for KPI 1 in region 1. As depicted in the KPI chart 480, the KPI 1 value meets the KPI goal on some days and does not meet the KPI goal on other days. Thus, the user can compare the performance of the telecommunications network in region 1 to the corresponding KPI goals within the same KPI chart 480, thereby reducing the amount of space needed in the user interface 400 to display content.

Example Network Equipment Adjustment Routine

Figure 5:
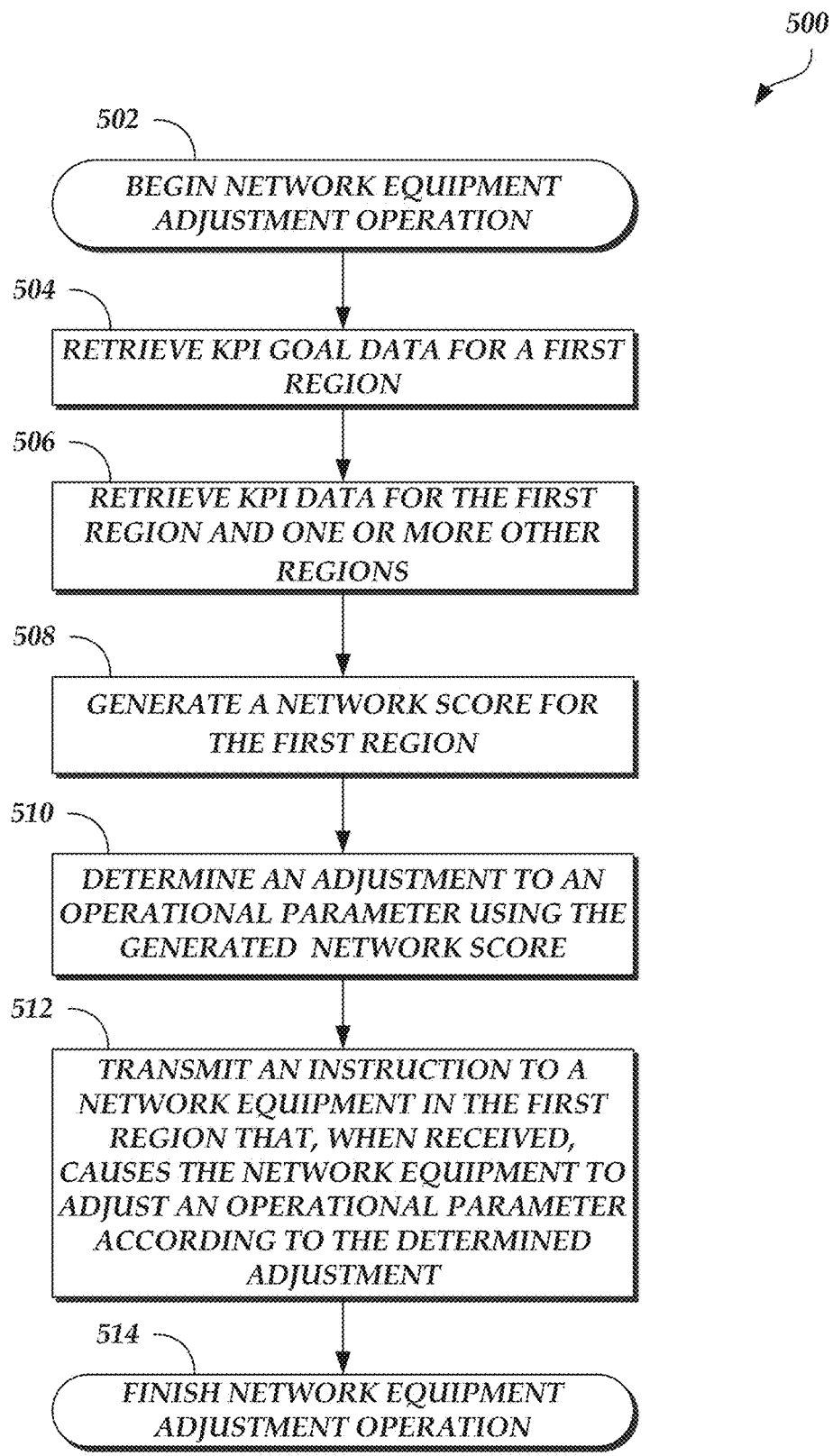
FIG. 5 is a flow diagram depicting a network equipment adjustment routine illustratively implemented by a network equipment operation adjustment system, according to one embodiment.

FIG. 5 is a flow diagram depicting a network equipment adjustment routine 500 illustratively implemented by a network equipment operation adjustment system, according to one embodiment. As an example, the network equipment operation adjustment system 140 of FIG. 1 can be configured to execute the network equipment adjustment routine 500. The network equipment adjustment routine 500 begins at block 502.

At block 504, KPI goal data is retrieved for a first region. For example, the KPI goal data can be retrieved from the region KPI goal data store 147.

At block 506, KPI data for the first region and one or more other regions is retrieved. In further embodiments, metrics data for the first region is also retrieved.

At block 508, a network score for the first region is generated. For example, the network score can be generated using the KPI goal data, the KPI data, and/or the metrics data.

At block 510, an adjustment to an operational parameter is determined using the generated network score. For example, a machine learning model can be used to determine the operational parameter adjustment. The adjustment may be to an operational parameter of a network equipment 130 or an access network 120 component.

At block 512, an instruction is transmitted to a network equipment in the first region that, when received, causes the network equipment to adjust an operational parameter according to the determined adjustment. After the instruction is transmitted, the network equipment adjustment routine 500 is complete, as shown at block 514.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
retrieving key performance indicator (KPI) goal data for a first geographic region;
determining a first score using the KPI goal data;

retrieving KPI data for the first geographic region and one or more other geographic regions;

determining a second score using the KPI data;

generating a network score for the first geographic region based on the first score and the second score;

identifying a network equipment to reconfigure using the generated network score;

determining an adjustment to an operational parameter of the network equipment using the generated network score; and transmitting an instruction to the network equipment, wherein the instruction comprises an indication of the determined adjustment to the operational parameter, wherein reception of the instruction causes the network equipment to adjust the operational parameter according to the determined adjustment.

2. The computer-implemented method of claim 1, wherein identifying a network equipment to reconfigure further comprises applying the network score as an input to a machine learning model, wherein execution of the machine learning model results in an identification of the network equipment and the adjustment to the operational parameter.

3. The computer-implemented method of claim 2, wherein the machine learning model is trained based on training data that comprises at least one of information identifying a past network score of a second geographic region, a past KPI value of the second geographic region, an identification of a second network equipment that was reconfigured in the second geographic region, a second operational parameter that was adjusted, an indication of a change in a second network score of the second geographic region in response to adjustment of the second operational parameter, network score trend data, or KPI trend data.

4. The computer-implemented method of claim 1, further comprising generating user interface data, wherein the user interface data, when executed by a user device, causes the user device to display an interactive user interface depicting the network score.

5. The computer-implemented method of claim 4, wherein the interactive user interface includes a shape corresponding to the first geographic region, wherein selection of the shape causes the interactive user interface to display a portion of the KPI data corresponding to the first geographic region.

6. The computer-implemented method of claim 1, wherein generating the network score further comprises:

comparing the KPI goal data with a portion of the KPI data corresponding to the first geographic region to determine the first score;

comparing the portion of the KPI data corresponding to the first geographic region with another portion of the KPI data corresponding to the one or more other geographic regions to determine the second score; and aggregating the first score and the second score.

7. The computer-implemented method of claim 6, wherein aggregating the first score and the second score further comprises:

retrieving extra metrics data for the first geographic region;

processing the extra metrics data to determine an extra score; and aggregating the first score, the second score, and the extra score.

8. The computer-implemented method of claim 1, wherein the network equipment is located within an access network of a telecommunications network.

9. The computer-implemented method of claim 8, wherein the network equipment comprises one of a cell site, a base station, or a cellular tower.

10. The computer-implemented method of claim 1, wherein the KPI data comprises at least one of voice accessibility data, voice drop call rate data, session initiation protocol (SIP) drop call rate data, combined drop call rate data, user equipment (UE) downlink throughput data, UE uplink throughput data, leakage data, network interference data, signal strength data, voice traffic data, or data traffic data.

11. Non-transitory, computer-readable storage media comprising computer-executable instructions, wherein the computer-executable instructions, when executed by a computer system, cause the computer system to:

retrieve key performance indicator (KPI) goal data for a first geographic region;

determine a first score using the KPI goal data;

retrieve KPI data for the first geographic region and a second geographic region;

determine a second score using the KPI data;

generate a network score for the first geographic region based on the first score and the second score;

determine an adjustment to an operational parameter of a network equipment using the generated network score; and transmit an instruction to the network equipment, wherein the instruction comprises an indication of the determined adjustment to the operational parameter, wherein reception of the instruction causes the network equipment to adjust the operational parameter according to the determined adjustment.

12. The non-transitory, computer-readable storage media of claim 11, wherein the computer-executable instructions further cause the computer system to apply the network score as an input to a machine learning model, wherein execution of the machine learning model results in an identification of the network equipment and the adjustment to the operational parameter.

13. The non-transitory, computer-readable storage media of claim 12, wherein the machine learning model is trained based on training data that comprises at least one of information identifying a past network score of a second geographic region, a past KPI value of the second geographic region, an identification of a second network equipment that was reconfigured in the second geographic region, a second operational parameter that was adjusted, an indication of a change in a second network score of the second geographic region in response to adjustment of the second operational parameter, network score trend data, or KPI trend data.

14. The non-transitory, computer-readable storage media of claim 11, wherein the computer-executable instructions further cause the computer system to generate user interface data, wherein the user interface data, when executed by a user device, causes the user device to display an interactive user interface depicting the network score.

15. The non-transitory, computer-readable storage media of claim 14, wherein the interactive user interface includes a shape corresponding to the first geographic region, wherein selection of the shape causes the interactive user interface to display a portion of the KPI data corresponding to the first geographic region.

16. A system comprising:

a data store configured to store key performance indicator (KPI) data for a first geographic region and a second geographic region and KPI goal data for the first geographic region; and a network equipment operation adjustment system comprising a processor in communication with the data store and configured with specific computer-executable instructions to:
determine a first score using the KPI goal data;
retrieve the KPI data;
determine a second score using the KPI data;
generate a network score for the first geographic region based on the first score and the second score;
determine an adjustment to an operational parameter of a network equipment using the generated network score; and
transmit an instruction to the network equipment, wherein the instruction comprises an indication of the determined adjustment to the operational parameter, wherein reception of the instruction causes the network equipment to adjust the operational parameter according to the determined adjustment.

17. The system of claim 16, wherein the network equipment operation adjustment system is further configured with specific computer-executable instructions to apply the network score as an input to a machine learning model, wherein execution of the machine learning model results in an identification of the network equipment and the adjustment to the operational parameter.

18. The system of claim 17, wherein the machine learning model is trained based on training data that comprises at least one of information identifying a past network score of a second geographic region, a past KPI value of the second geographic region, an identification of a second network equipment that was reconfigured in the second geographic region, a second operational parameter that was adjusted, an indication of a change in a second network score of the second geographic region in response to adjustment of the second operational parameter, network score trend data, or KPI trend data.

19. The system of claim 16, wherein the network equipment operation adjustment system is further configured with specific computer-executable instructions to generate user interface data, wherein the user interface data, when executed by a user device, causes the user device to display an interactive user interface depicting the network score.

20. The system of claim 19, wherein the interactive user interface includes a shape corresponding to the first geographic region, wherein selection of the shape causes the interactive user interface to display a portion of the KPI data corresponding to the first geographic region.

21. A computer-implemented method comprising:
retrieving key performance indicator (KPI) goal data for a first geographic region;
retrieving KPI data for the first geographic region and one or more other geographic regions;
comparing the KPI goal data with a portion of the KPI data corresponding to the first geographic region to determine a region score;
comparing the portion of the KPI data corresponding to the first geographic region with another portion of the KPI data corresponding to the one or more other geographic regions to determine a national score;
aggregating the region score and the national score to generate a network score for the first geographic region;
identifying a network equipment to reconfigure using the generated network score;
determining an adjustment to an operational parameter of the network equipment using the generated network score; and
transmitting an instruction to the network equipment, wherein the instruction comprises an indication of the determined adjustment to the operational parameter, wherein reception of the instruction causes the network equipment to adjust the operational parameter according to the determined adjustment.

22. The computer-implemented method of claim 21, wherein aggregating the region score and the national score further comprises:
retrieving extra metrics data for the first geographic region;
processing the extra metrics data to determine an extra score; and
aggregating the region score, the national score, and the extra score.

* * * * *